United States Patent [19]

Briggs et al.

[11] Patent Number: 5,124,506
[45] Date of Patent: Jun. 23, 1992

[54] FACE PLATE WITH SEAL AND COVER

[75] Inventors: Robert C. Briggs, Newport; Steven P. Owens, Grantville; Wallace R. Savitsky; David D. Sonner, both of Harrisburg; Robert N. Weber, Hummelstown, all of Pa.

[73] Assignee: AMP Incorporated, Harrisburg, Pa.

[21] Appl. No.: 549,854

[22] Filed: Jul. 9, 1990

[51] Int. Cl.⁵ .......................................... H01R 13/447
[52] U.S. Cl. ...................................... 174/67
[58] Field of Search ............... 174/66, 67; 220/241, 220/242; 439/136, 142

[56] References Cited

U.S. PATENT DOCUMENTS

| | | | |
|---|---|---|---|
| 2,867,345 | 1/1959 | Bellek | 220/242 |
| 3,594,693 | 7/1971 | Robbins | 174/67 |
| 4,188,082 | 2/1980 | Dickey | 174/67 X |
| 4,494,815 | 1/1985 | Brzostek et al. | 174/66 X |
| 4,624,516 | 11/1986 | White | 339/40 |
| 4,669,802 | 6/1987 | Schaffer | 439/535 |
| 4,687,291 | 8/1987 | Stape et al. | 350/96.21 |

Primary Examiner—Leo P. Picard
Assistant Examiner—David A. Tone

[57] ABSTRACT

A face plate adaptor (10) includes spring driven doors (60) to seal apertures (42) and integral projections (46, 48) which latch connector halves (90, 100) to the plate. The adapter (10) precludes dust from collecting thereon and therein and provides an adequate bend radius for cable (90) extending within a wall box (16) to which the face plate is attached.

7 Claims, 3 Drawing Sheets

FACE PLATE WITH SEAL AND COVER

This invention relates to a wall box face plate for electrical and optical connectors which includes doors which seal connector halves mounted in such face plate.

BACKGROUND OF THE INVENTION

In general, electrical and particularly optical connectors function best in the absence of dust and other matter which may interfere with contact mating and/or alignment. The use of such devices is rapidly spreading from applications in relatively clean environments to applications in buildings, construction, and premise wiring wherein the products of construction, including airborne dust from drywall and finishing compounds, are pervasive. It frequently is impractical to install connectors and cable after such construction phases due to the need to place cable and wire and at least certain connectors in the walls during construction.

U.S. Pat. No. 4,687,291 issued Aug. 18, 1987 teaches a duplex electro-optic connector assembly which includes a door on one half of the connector which remains closed when such half of the connector is not mated in order to keep out unwanted particles. U.S. Pat. No. 4,669,802 issued Jun. 2, 1987 shows an outlet for optical fiber connectors which includes a face plate adapted to use with an outlet wiring box having a sloped hood portion and a connector axis of engagement downwardly to protect the connector and contain fiberoptic cables within the box.

The present invention represents improvements over the foregoing art and has as an objective the provision of a face plate adapter which allows connector halves to be sealed when not in use by a cover spring loaded to close off apertures in which connector halves are fitted. The invention has as a further object the provision of a face plate adapted to facilitate installation of connector halves in dust laden environment as in construction sites while protecting such connector halves. The invention has a final object of providing an improved face plate adapted which facilitates the use of fiber optic cable having restrictive bend radius.

SUMMARY OF THE INVENTION

The invention achieves the foregoing objectives by providing a face plate which includes a portion that angles outwardly from a wall box and downwardly to preclude the settling as by gravity of dust particles and contaminant material onto connector halves mounted within such adapter plate. The adapter plate includes apertures with integral projections adapted to receive connector halves and latch such halves to said plate, and at the same time, utilize the latching structures of connector halves to latch such halves together and to such plate. The adapter plate includes hinged covers which are spring loaded to close in the absence of a mated connector and further includes integrally therewith latching projections which fit within apertures of the face plate and latch such covers thereto to facilitate opening and closing of such covers. The face plate provides added room for coaxial connectors and for fiber optic connectors which may have critical bending radii.

IN THE DRAWINGS

DESCRIPTION OF PREFERRED EMBODIMENT

Figure 1:
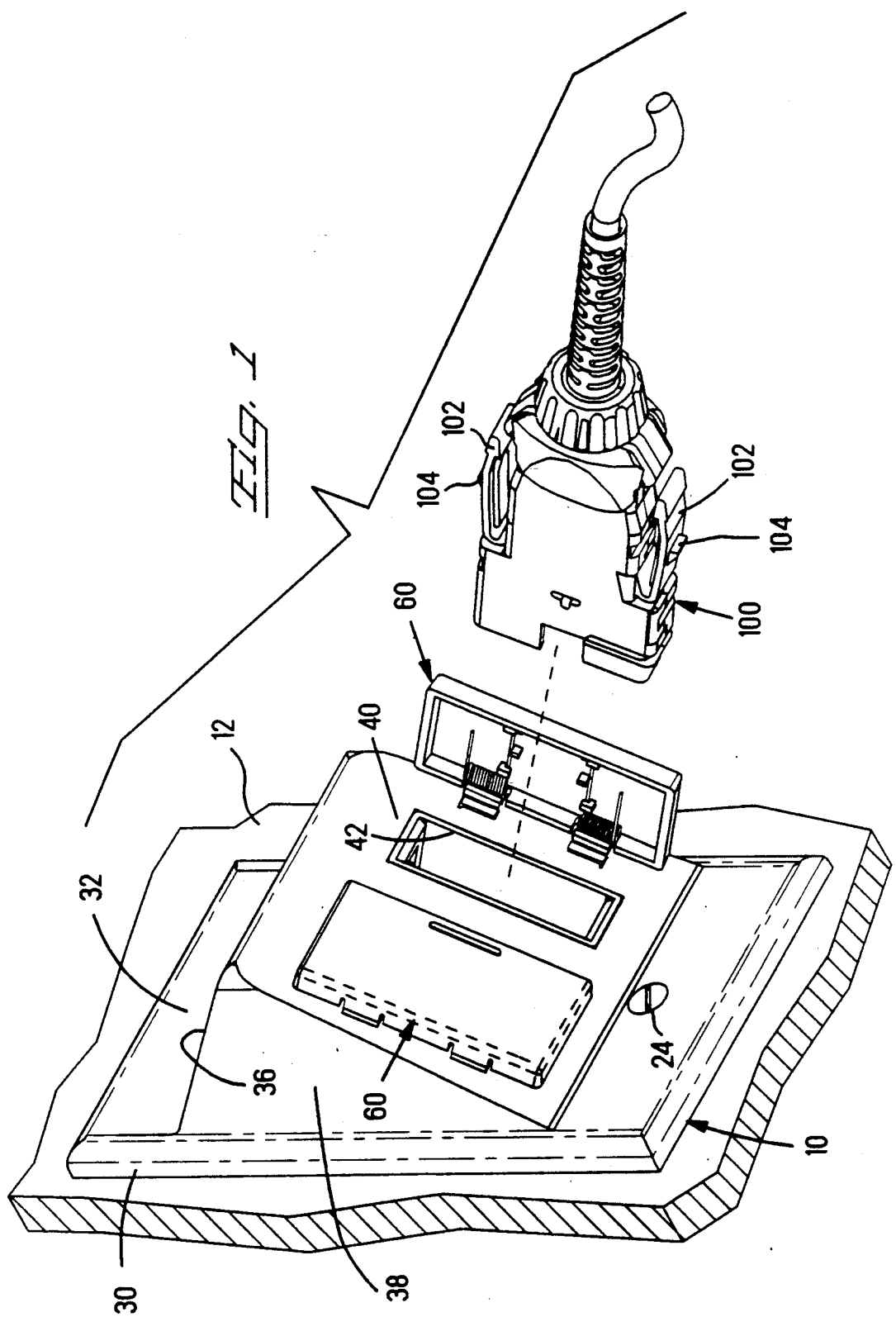
FIG. 1 is a perspective view showing the invention face plate adapter mounted to a wall and preparatory to receiving the plug half of a duplex connector inserted into the receptacle half mounted in such adapter.
Figure 2:
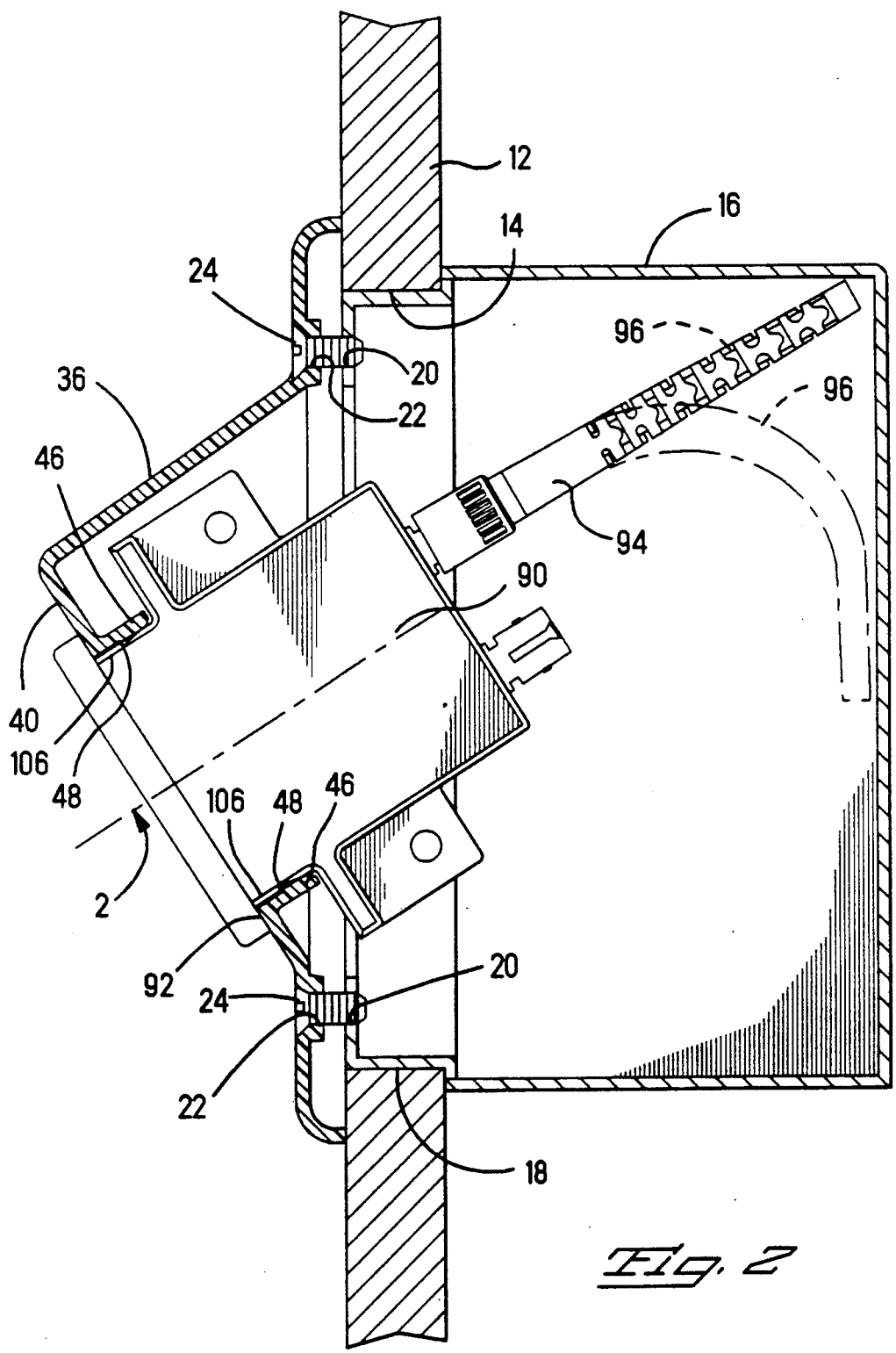
FIG. 2 is a side elevational view in partial section showing the adapter of FIG. 1 as attached to a wall box.

In reference to FIG. 1, a face plate adapter 10 is shown relative to a wall 12 and a plug connector half 100 positioned apart from such adaptor and preparatory to being plugged therein. FIG. 2 shows an insertion axis 2 for such connector half 100 and further includes a mating receptacle connector half 90 mounted in such adaptor 10 as attached to the wall 12 and contained within a wall box 16. The wall box 16 is offset as at 18 to fit within an aperture of wall board 12. Boxes such as wall box 16 are typically made of plastic or metal and have dimensions in a vertical sense on the order of roughly 4 inches or 10.16 cm. by 2.1 inches or 5.334 cm. for use in wall board on the order of 0.5 inch or 1.27 cm. in thickness. The wall box 16 includes a face apertured as at 20 which line up with apertures 22 in the face plate adapter 10. Fasteners such as screws 24 may be fitted through 22 to engage 20 and lock the face plate adapter 10 to wall 12.

The face plate adapter 10 includes a skirt 30 and a portion 32 essentially parallel to the surface of wall 12. Projecting therefrom is an integral portion including a top 36 which slopes downwardly as indicated in FIG. 2 and side walls 38 which extend essentially perpendicularly to wall 12. The portions 36 and 38 join a face 40 oriented downwardly and apertured as at 42. The face 40 is positioned thereby in a downward orientation to preclude gravitational settling of dust and debris thereon. With a connector half such as 90 mounted in an aperture 42 in a manner to be described, the cable 96 issuing therefrom, including the strain relief 94, will have a bend radius more or less as shown in FIG. 2 in phantom which is particularly advantageous with respect to certain types of cable, including particularly so called fiber optic cable and certain coaxial cable. The face plate 10 projects outwardly relative to the wall box 16 to provide an interior dimension allowing a bend in the cable 96 connected to the connector half 90 in a radius greater than a minimum bend radius for the cable 96.

Figure 3:
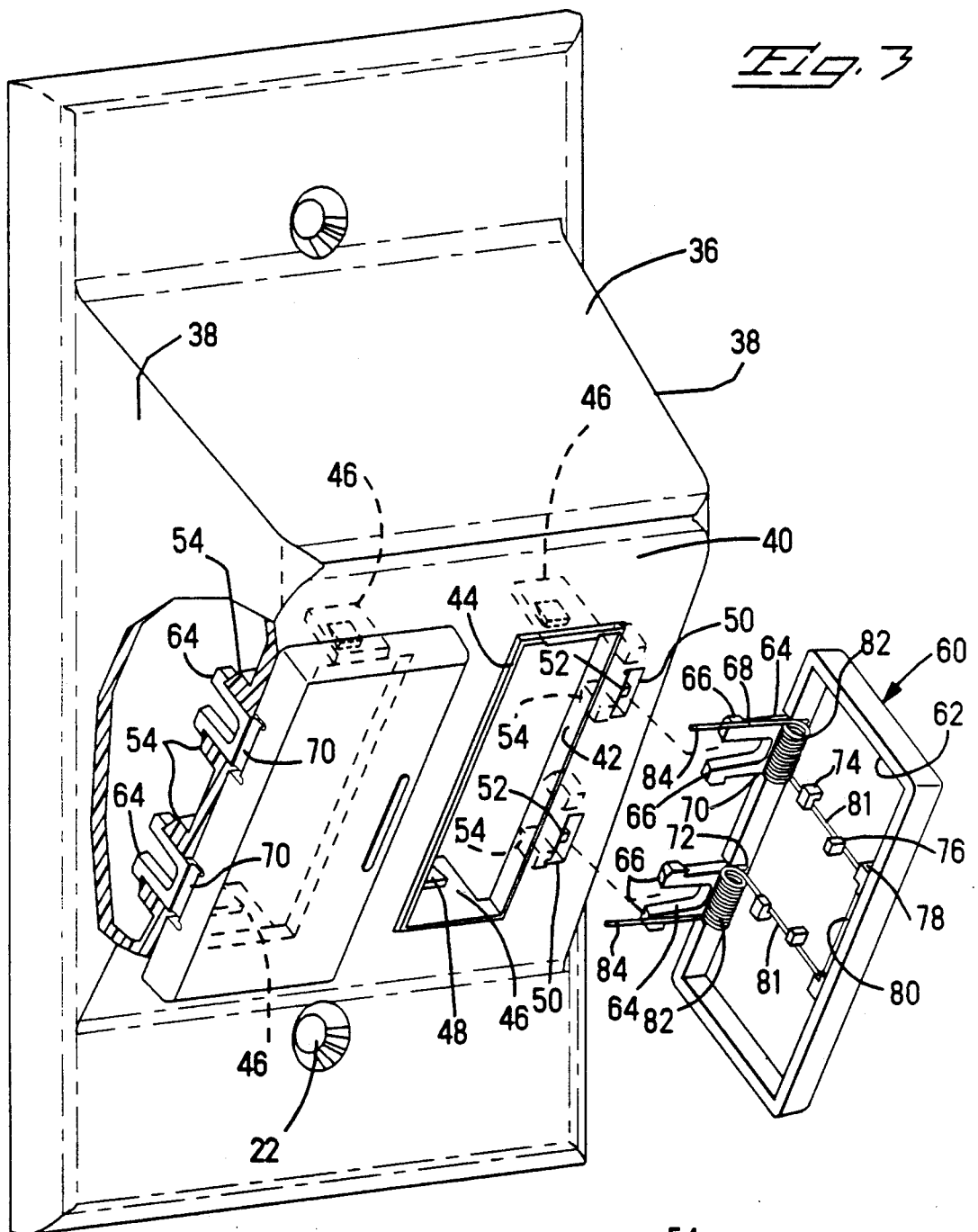
FIG. 3 is a perspective view, partially sectioned, of the adapter of FIG. 1 with one of the doors removed herefrom to show latching and spring details.
Figure 4:
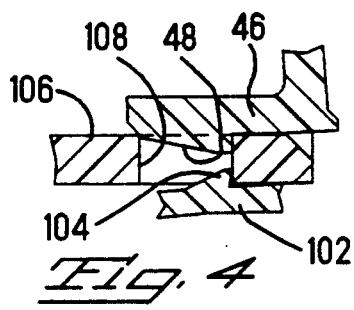
FIG. 4 is a sectional view of the latch structure of the adapter in relation to mating connector halves.

Referring now to FIG. 3, the unitary, one-piece, face plate adapter 10 may be seen to include, in addition to apertures 42, certain details extending around the periphery of the apertures 42 including a raised lip 44 which serves to preclude dust seepage within the aperture and into the connector retained therein, when the cover shown as 60 is closed thereover. Interiorly projecting alongside each aperture 42 is a latch element 46 containing a beveled projecting latch surface 48 directed inwardly. See FIG. 4. The latch surface 48 engages a wall 106 of a receptacle connector half 90 plugged into the adapter 10 which includes an aperture 108 into which latch surface 48 snaps to latch the receptacle 90 against backward displacement relative to the adapter 10. The aperture 108 is deep enough also to accommodate a latching projection 104 extending from a spring arm 102 of the connector plug half 100, shown in FIG. 1. The aperture 108 thus receives and accommodates simultaneously the latch surface 48 and the projection 104 to hold a connector half 90 to the adapter 10 which in turn is held to a wall box 16 and to hold the mating connector halves 90,100.

Figure 5:
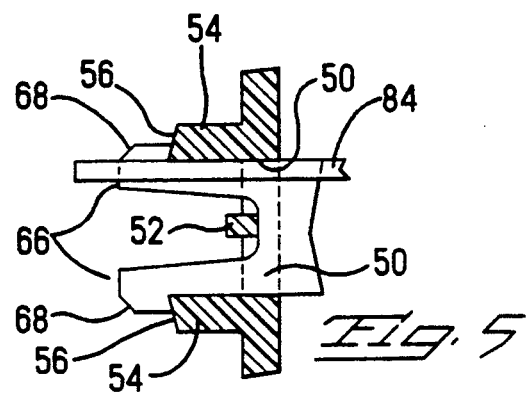
FIG. 5 is an elevational, sectional, and partially phantom view showing the hinge structure of the invention.

Referring to FIG. 3, alongside each aperture 42 are a pair of further apertures 50 bisected by a rib 52 of the face 40. Also extending in the manner shown in FIG. 3 interior of the face plate are a pair of projections 54 which are sloped at the tips as at 56 to define sloped latching surfaces engaged by portions of a latch structure of the cover 60. FIG. 5 shows projections 54 in sectional detail as well as the rib 52 and the latches 64 of the latching structure of the cover.

Each of the covers 60, one shown in place and closed in FIG. 3 and one shown removed therefrom preparatory to insertion, is molded of plastic to include a lip 62 which fits around the lip 44 to seal the adapter 10 and interior of the box 16. Each cover 60 includes a pair of latches 64, each of which in turn includes a pair of arms 66 beveled as at 68 and integrally joined with a cover 60 by a hinge 70 of reduced thickness to permit a hinging action and flexibility as between 64 and the cover 60. Each hinge structure is relieved as at 72 and there is included interiorly of each cover 60 a projection 74, a projection 76, and a further projection 78. The projections 74 and 78 are internally relieved to accommodate a spring 80 with a straight end 81 nested and against 74, 76, and 78 and locked to the cover 60. The spring 80 includes at each end a coil section 82 having a projection 84 which fits within the aperture 50 and extends interiorly of the face plate 10. The springs 80 bias the doors 60 shut over the apertures 42. Each cover is assembled by extending the latches 64 within the apertures 50 in a manner shown in FIG. 5 until the arms 66 overlap the projections 56 to lock the covers 60 to the front of the adapter 10. Once this is done, if the cover 60 is released, it will pivot about the hinges 70 to a shut position shown in FIG. 3. Thereafter, to utilize a receptacle 90 positioned within the adapter, a cover 60 is opened and a connector half 100 inserted into the receptacle 90 latched to the adapter 10. Upon removal of such connector half 100, the cover 60 closes and thus seals the receptacle 90 and the interior of the wall box 16 from dust or debris.

With respect to the invention, samples of the adapter were molded of polyphenylene oxide plastic and covers were molded of thermoplastic P.B.T.

Having now described the invention in a preferred embodiment intended to enable those skilled in the art to practice the invention, we set forth what is inventive in the appended claims.

We claim:

1. A face plate for use with a wall box and mateable connector halves of a type having latching means for engaging one another to latch the said connector halves together, one said connector half having a pair of latch apertures extending laterally of the mating axis of the connectors engaging latch projections in the other said connector half, the face plate being adapted to fit onto a wall box to house the one said connector half and including at least an aperture therein adapted to receive the one said connector half, a pair of projections extending interiorly of the said aperture, and each of said projections including a latch means for engaging the latch apertures of the one said connector half to latch the one said connector half to said face plate, a further aperture in said face plate, and a cover having latches fitted in said further aperture to latch said cover to said face plate.

2. The face plate of claim 1 wherein said cover includes integral therewith hinges having said latches thereon.

3. The face plate of claim 1 wherein the face plate projects outwardly relative to the wall box to provide an interior dimension allowing a bending of the cable connected to a connector half in a radius greater than the minimum bend radius for the cable.

4. A face plate of claim 1, and further including: a raised lip extending around the periphery of said aperture adapted to receive the one said connector half, and the cover being adapted to be closed over said lip.

5. A face plate assembly, comprising: a face plate for attachment to a wall, a face of the face plate adapted for covering a wall box in the wall, a first aperture through the face, latch elements behind the face having latching projections, a receptacle connector half behind the face and having apertures in opposite walls latching to said latching projections, and for latching to corresponding latching projections on a plug connector half to be received though said first aperture through the face, a cover secured by a hinge to the face plate for covering the first aperture through the face, and the hinge having a latch engaged in a second aperture of the face plate.

6. A face plate assembly as recited in claim 5, and further including: a cable attached to the receptacle connector half, a strain relief over the cable, the cable and the strain relief bending within the wall box in a radius greater than a minimum bending radius for the cable, the face projecting out from the wall box to provide an interior dimension for the cable and the strain relief bending within the wall box.

7. A face plate assembly as recited in claim 5, and further including: a raised lip extending around the periphery of said first aperture, and the cover being adapted to be closed over said lip.

* * * * *